(12) United States Patent
Guo

(10) Patent No.: US 8,566,623 B2
(45) Date of Patent: Oct. 22, 2013

(54) START-UP CONTROL APPARATUS AND METHOD

(75) Inventor: Li-Wen Guo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 13/164,442

(22) Filed: Jun. 20, 2011

(65) Prior Publication Data

US 2012/0079292 A1 Mar. 29, 2012

(30) Foreign Application Priority Data

Sep. 29, 2010 (CN) .......................... 2010 1 0296588

(51) Int. Cl.
*G06F 15/177* (2006.01)
(52) U.S. Cl.
USPC .................................. 713/300; 713/1; 713/2
(58) Field of Classification Search
USPC ................................................ 713/300, 1, 2
See application file for complete search history.

(56) References Cited

U.S. PATENT DOCUMENTS

| | | | |
|---|---|---|---|
| 6,272,630 B1 * | 8/2001 | Chen et al. .......................... | 713/2 |
| 6,775,784 B1 * | 8/2004 | Park .............................. | 713/320 |
| 7,240,222 B1 * | 7/2007 | Falik et al. ..................... | 713/300 |
| 2002/0118235 A1 * | 8/2002 | Narazaki et al. .................. | 347/5 |
| 2004/0205362 A1 * | 10/2004 | Catherman et al. ........... | 713/300 |
| 2004/0207440 A1 * | 10/2004 | Robertson et al. ............. | 327/291 |
| 2010/0095138 A1 * | 4/2010 | Huang et al. .................. | 713/300 |
| 2012/0124397 A1 * | 5/2012 | Brooks et al. ................. | 713/300 |

* cited by examiner

*Primary Examiner* — Vincent Tran
(74) *Attorney, Agent, or Firm* — Altis & Wispro Law Group, Inc.

(57) ABSTRACT

A start-up control apparatus r includes a control chip, an advanced configuration and power management interface (ACPI) controller, and a firmware. The ACPI controller is used for receiving a trigger signal and sending a start-up signal corresponding to the trigger signal to the control chip if a computer system is powered off. The firmware is used for sending a status signal to the control chip after the firmware finishes initialization. Wherein the control chip is used for sending the start-up signal to a power supply to provide power for powering on the computer system after receiving the status signal.

10 Claims, 2 Drawing Sheets

START-UP CONTROL APPARATUS AND METHOD

CROSS-REFERENCE TO RELATED APPLICATIONS

Relevant subject matter is disclosed in co-pending U.S. patent applications entitled "START-UP CONTROL APPARATUS AND METHOD," U.S. application Ser. No. 13/164,442, Filed on Jun. 20, 2011.

BACKGROUND

1. Technical Field

The present disclosure relates to start-up control apparatuses and methods.

2. Description of Related Art

A server generally includes a variety of firmware, for example, a baseboard management controller (BMC). The firmware is initialized when the server is started up. However, initialization may take a lot of time. Different firmware may have different initialization times. On start-up, the power supply provides power for powering on the server after a reference time defined by the server. If the reference time exceeds the initialization time of some firmware, the server may have problems because some firmware has not finished initialization.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
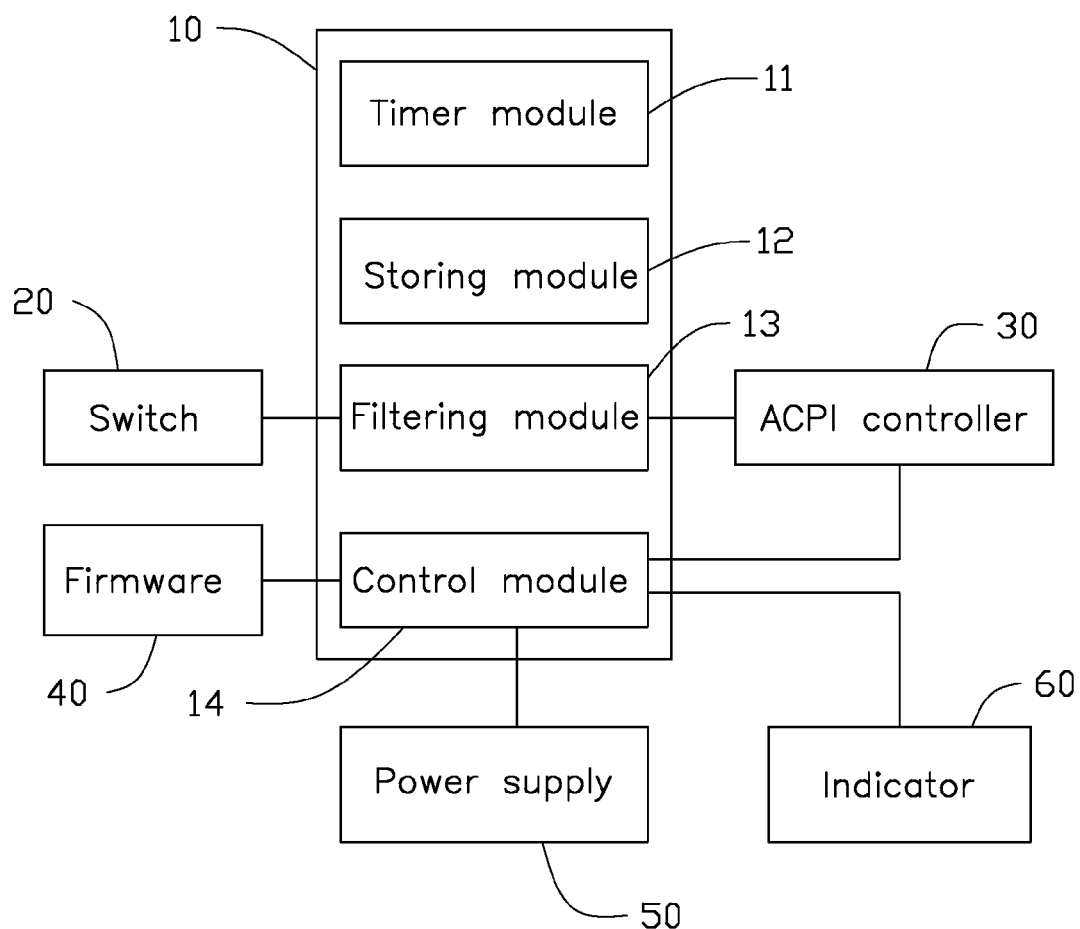
FIG. 1 is a schematic view of a start-up control apparatus in accordance with an embodiment.

Referring to FIG. 1, a start-up control apparatus, applied in a computer system, includes a control chip 10, a switch 20, an advanced configuration and power management interface (ACPI) controller 30, a firmware 40, a power supply 50, and an indicator 60. In one embodiment, the computer system is a server.

The control chip 10 includes a timer module 11, a storing module, a filtering module 13, and a control module 14.

The switch 20 is connected to the filtering module 13. The filtering module 13 is connected to the ACPI controller 30. The firmware 40 is connected to the control module 14. The control module 14 is connected to the ACPI controller 30 and the indicator 60. The power supply 50 is connected to the control module 14. In one embodiment, the firmware 40 is a BMC, and the ACPI controller 30 is disposed in a south bridge chip.

A power source of the server, for example, a battery, provides power for the control chip 10, the ACPI controller 30, and the firmware 40 when the server is connected to an external power source. At this time, the timer module 11 begins to record time. The storing module is used for storing a reference time. The switch 20 is used for creating a trigger signal. The filtering module 13 is used for filtering the trigger signal. In one embodiment, the filtering module 13 uses glitch filtering.

The ACPI controller 30 is used for sending a start-up signal to the control module 14 after determining the server is power off. The firmware 40 is used for sending a status signal to the control module 14 after the firmware 40 has been initialized.

The control module 14 is used for sending the start-up signal to the power supply 50 to provide power for powering on the server after receiving the status signal from the firmware 40. The control module 14 is further used for judging if time kept by the timer module 11 exceeds the reference time when the control module 14 does not receive the status signal. If the time kept by the timer module 11 exceeds the reference time, the control module 14 sends the start-up signal to the power supply 50 to provide power for the server and sends an indicating signal to the indicator 60 to cancel the initialization. If the time does not exceed the reference time, the control module 14 determines if the control module 14 receives the status signal again. In one embodiment, the indicator 60 is a light-emitting diode (LED).

Figure 2:
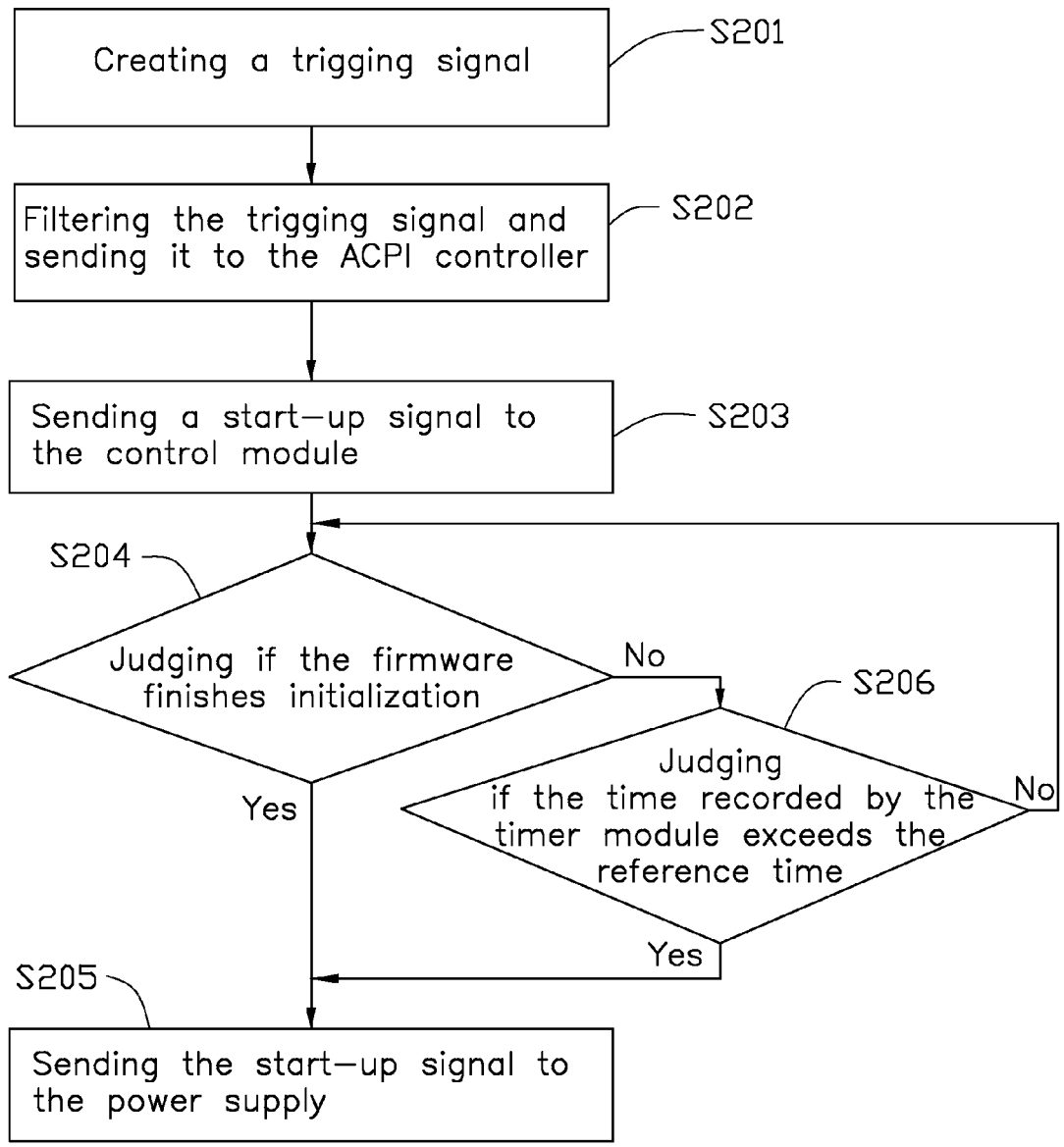
FIG. 2 is a flow chart of a start-up control method in accordance with an embodiment.

Referring to FIGS. 1 and 2, a start-up method is shown. An embodiment of the method is as follows.

In step S201, the switch 20 is pressed to create a trigger signal.

In step S202, the filtering module 13 filters the trigger signal and sends the filtered trigger signal to the ACPI controller 30.

In step S203, the ACPI controller 30 send a start-up signal to the control module 14 after determining the server is powered off.

In step S204, the control module 14 determines if the control module 14 receives the status signal from the firmware 40. If so, the process turns to step S205. If not, the process turns to step S206.

In step S205, the control module 14 sends the start-up signal to the power supply 50 to provide power for powering on the server.

In step S206, the control module 14 determines if time kept by the timer module 11 exceeds the reference time. If so, the control module 14 sends an indicating signal, which indicates initialization of the firmware 40 is not finished, to the indicator 60, and the process returns to step S205. If not, the process returns to step S204.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A start-up control apparatus, comprising:
   a control chip;
   an advanced configuration and power management interface (ACPI) controller, the ACPI controller adapted to send a start-up signal when receiving a trigger signal to the control chip if a computer system is powered off; and
   a firmware, the firmware adapted to send a status signal to the control chip after the firmware finishes initialization;
   wherein the control chip is adapted to send the start-up signal to a power supply to provide power for powering on the computer system after receiving the status signal; the control chip comprises a control module, a storing module for storing a reference time, and a timer module for recording time after the firmware is powered on the control module adapted to determine if time kept by the timer module exceeds the reference time after the control module does not receive the status signal; and the control module further adapted to send the start-up signal to the power supply to provide power for powering on the computer system if the time of the timer module exceeds the reference time.

2. The start-up control apparatus of claim 1, further comprising an indicator, wherein the control module is further adapted to send an indicating signal for indicating initialization of the firmware is not finished to the indicator when the time of the timer module exceeds the reference time.

3. The start-up control apparatus of claim 1, further comprising a filtering module, wherein the filtering module is adapted to filter the trigger signal before the trigger signal is sent to the ACPI controller.

4. The start-up control apparatus of claim 1, wherein the firmware is a baseboard management controller.

5. A start-up control method, comprising:
sending a trigger signal by a control chip to an advanced configuration and power management interface (ACPI) controller;
determining when a computer system is powered off by the ACPI controller;
sending a start-up signal corresponding to the trigger signal by the ACPI controller to the control chip; and
sending the start-up signal by the control chip to a power supply to provide power for powering on the computer system if the control chip receives a status signal from a firmware that shows the firmware finishes initialization;
wherein the control chip records time when the firmware is power on the control chip determines if time kept by the control chip exceeds a reference time if so, the control chip sends the start-up signal to the power supply to provide power for powering on the computer system; and the control chip sends an indicating signal for indicating initialization of the firmware is not finished to an indicator when the time exceeds the reference time.

6. The start-up control method of claim 5, wherein the control chip filters the trigger signal before sending the trigger signal to the ACPI controller.

7. The start-up control method of claim 5, wherein the firmware is a baseboard management controller.

8. A start-up control apparatus, comprising:
a control chip;
an advanced configuration and power management interface (ACPI) controller, the ACPI controller adapted to send a start-up signal when receiving a trigger signal to the control chip if a computer system is powered off;
a firmware, the firmware adapted to send a status signal to the control chip after the firmware finishes initialization; and
an indicator;
wherein the control chip is adapted to send the start-up signal to a power supply to provide power for powering on the computer system after receiving the status signal;
the control chip comprises a control module, a storing module for storing a reference time, and a timer module for recording time after the firmware is powered on; the control module adapted to determine if time kept by the timer module exceeds the reference time after the control module does not receive the status signal; and the control module further adapted to send the start-up signal to the power supply to provide power for powering on the computer system if the time of the timer module exceeds the reference time; and the control module is further adapted to send an indicating signal for indicating initialization of the firmware is not finished to the indicator when the time of the timer module exceeds the reference time.

9. The start-up control apparatus of claim 8, further comprising a filtering module, wherein the filtering module is adapted to filter the trigger signal before the trigger signal is sent to the ACPI controller.

10. The start-up control apparatus of claim 8, wherein the firmware is a baseboard management controller.

\* \* \* \* \*